(12) United States Patent
    Elsom

(10) Patent No.: US 11,613,083 B2
(45) Date of Patent: *Mar. 28, 2023

(54) PIG FOR USE IN A SYSTEM FOR LINING DUCTS WATER OR SEWAGE PIPES

(71) Applicant: AQUALINER LIMITED, Leicestershire (GB)

(72) Inventor: Robin Elsom, Umberleigh (GB)

(73) Assignee: AQUALINER LIMITED, Leicestershire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/702,297

(22) Filed: Mar. 23, 2022

(65) Prior Publication Data

US 2022/0212416 A1    Jul. 7, 2022

Related U.S. Application Data

(63) Continuation of application No. 16/970,571, filed as application No. PCT/GB2019/050441 on Feb. 19, 2019, now Pat. No. 11,305,492.

(30) Foreign Application Priority Data

Feb. 19, 2018    (GB) ...................................... 1802664

(51) Int. Cl.
    *B29C 65/10*    (2006.01)
    *B29C 65/00*    (2006.01)
    (Continued)

(52) U.S. Cl.
    CPC .............. *B29C 65/10* (2013.01); *B29C 66/61* (2013.01); *B29C 66/729* (2013.01); *B32B 1/08* (2013.01);
    (Continued)

(58) Field of Classification Search
    CPC ..... Y10T 156/1788; F16L 55/26; F16L 55/28; F16L 55/40; F16L 55/1653;
    (Continued)

(56) References Cited

U.S. PATENT DOCUMENTS 3,643,280 A    2/1972  Powers
4,741,795 A    5/1988  Grace
    (Continued)

FOREIGN PATENT DOCUMENTS

DE    3904524 A1 *  8/1990    ................ E03F 3/06
DE    3904524 A1    8/1990
    (Continued)

*Primary Examiner* — Carson Gross
(74) *Attorney, Agent, or Firm* — FisherBroyles, LLP; Jason P. Mueller

(57) ABSTRACT

The present invention relates to a pig for use in a system for lining ducts such as water or sewage pipes or electrical ducts or gas pipes. The pig is insertable at least partly within a fabric liner sleeve located in a duct such as a water or sewage pipe and is capable of heating the liner sleeve in situ in the duct to melt or soften thermoplastic material of the liner sleeve to subsequently form, on cooling of the melted thermoplastic material, a rigid liner in the duct. A pig for fitting a liner to the inside of a pipe, comprising a pig body defining a longitudinal axis in a longitudinal direction from a front portion to a rear portion; a gas supply port in the front portion; a gas outlet diffuser forming part of the rear portion; a heating chamber in the pig body forming a flow path from the fluid inlet to the outlet diffuser; and a heater within the heating chamber, wherein the outlet diffuser comprises a plurality of channels, each channel comprising an inlet facing the front portion in the longitudinal direction and an outlet extending radially outwardly from the longitudinal axis.

14 Claims, 6 Drawing Sheets

(51) Int. Cl.
  *B32B 1/08* (2006.01)
  *B32B 37/00* (2006.01)
  *B32B 37/06* (2006.01)
  *B32B 37/16* (2006.01)
  *B29K 101/12* (2006.01)
  *F16L 101/18* (2006.01)

(52) U.S. Cl.
  CPC .......... *B32B 37/0046* (2013.01); *B32B 37/06* (2013.01); *B32B 37/16* (2013.01); *B29K 2101/12* (2013.01); *B32B 2305/18* (2013.01); *B32B 2398/20* (2013.01); *B32B 2597/00* (2013.01); *F16L 2101/18* (2013.01); *Y10T 156/1788* (2015.01)

(58) Field of Classification Search
  CPC ...... F16L 2101/18; B29C 66/61; B29C 65/10; B32B 37/0046; B32B 37/06; E03F 2003/065

See application file for complete search history.

(56) References Cited

U.S. PATENT DOCUMENTS

| | | | |
|---|---|---|---|
| 4,781,780 A * | 11/1988 | Hannover | B29C 63/46 156/287 |
| 5,309,947 A | 5/1994 | Hinger | |
| 6,228,312 B1 | 5/2001 | Boyce | |
| 7,827,646 B2 | 11/2010 | Pruett | |
| 8,281,444 B2 | 10/2012 | Rosen | |
| 2004/0036202 A1 | 2/2004 | Weatherby | |
| 2017/0299106 A1 | 10/2017 | Lindelof | |

FOREIGN PATENT DOCUMENTS

| | | |
|---|---|---|
| EP | 0369998 A2 | 5/1990 |
| EP | 3336404 A1 | 6/2018 |
| GB | 1366122 | 9/1974 |
| GB | 2554431 A | 4/2018 |
| JP | S63162221 A | 7/1988 |
| JP | H01154729 A | 6/1989 |
| JP | H11147063 A | 6/1999 |
| JP | 2001310388 A | 11/2001 |
| JP | 2002086564 | 3/2002 |
| JP | 2016016615 A | 2/2016 |
| WO | 1996018493 A1 | 6/1996 |
| WO | 1998026919 A1 | 6/1998 |
| WO | 0225156 | 3/2002 |
| WO | 2004090411 A1 | 10/2004 |

* cited by examiner

US 11,613,083 B2

PIG FOR USE IN A SYSTEM FOR LINING DUCTS WATER OR SEWAGE PIPES

This application is a continuation of U.S. patent application Ser. No. 16/970,571, filed Aug. 17, 2020, which is a national stage entry under 35 U.S.C. 371 of PCT Patent Application No. PCT/GB2019/050441, filed Feb. 19, 2019, which claims the benefit of United Kingdom Patent Application No. 1802664.1, filed Feb. 19, 2018, the entire contents of each of which are incorporated herein by reference.

The present invention relates to a pig for use in a system for lining ducts such as water or sewage pipes or electrical ducts or gas pipes. The pig is insertable at least partly within a fabric liner sleeve located in a duct such as a water or sewage pipe and is capable of heating the liner sleeve in situ in the duct to melt or soften thermoplastic material of the liner sleeve to subsequently form, on cooling of the melted thermoplastic material, a rigid liner in the duct.

WO98/26919 describes how a pipe, for instance a water pipe or a sewage pipe, can be rehabilitated by the use of a tubular liner which is introduced into the pipe as a fabric sleeve in a collapsed form and then is expanded into contact with the pipe wall. Next heat is applied to the liner and the liner is subsequently allowed to cool, whereupon the liner forms a hard and rigid tubular lining for the pipe. The fabric sleeve used in the process comprises a thermoplastic composite interweaved with reinforcing fibres. The thermoplastic material is melted by heating in situ in the pipe and then allowed to harden to form the tubular liner within the pipe. A specially constructed pig is used to apply heat to the sleeve in situ in the pipe to form the liner.

WO02/25156 provides details of a pig which is used to direct hot air through a fabric sleeve of composite material, comprising thermoplastics and fibre reinforcements, in order to melt the thermoplastic material and allow the formation of a hard sleeve in situ in a duct.

WO2004/090411 describes a further variant of pig used in a system for lining ducts. The pig described in the document is designed to force hot gas under pressure through a fabric sleeve comprising thermoplastic material and reinforcing fibres, and the pig has heating means both within and outside the fabric sleeve, to ensure uniform heating of the sleeve.

In order to achieve a practical and useful system of the type described in the prior art, the length of the pig is usually limited to around 700 mm depending on the application or else navigating the pig around a curve in the pipe can become too difficult. This means that there is a limited space available within the pig for heating air to a temperature sufficient to ensure adequate heating of the fabric sleeve and also to ensure uniform melting of the thermoplastic material in the fabric sleeve. It is important not only to ensure that a correct air temperature is reached which will facilitate the melting of the thermoplastic material, but also to ensure that the hot air delivered from the pig is of a uniform temperature, otherwise there will be cold and hot spots in the fabric sleeve, which will mean that the duct liner is incorrectly formed or formed with points of weakness.

Furthermore, the inventors have realised that the means by which the hot air delivered must be carefully designed in order to provide a uniform delivery of hot air to the fabric sleeve around the circumference of the pig, otherwise, even with a uniformly heated air supply there will be cold and hot spots in the fabric sleeve, leading to points of weakness.

According to the invention, there is provided a pig defined by the claims.

For a better understanding of the invention, and to show how the same may be put into effect, reference will now be made, by way of example only, to the accompanying drawings in which:

FIG. 2c shows a schematic layout of the outlet diffuser of FIG. 2a;

Figure 1:
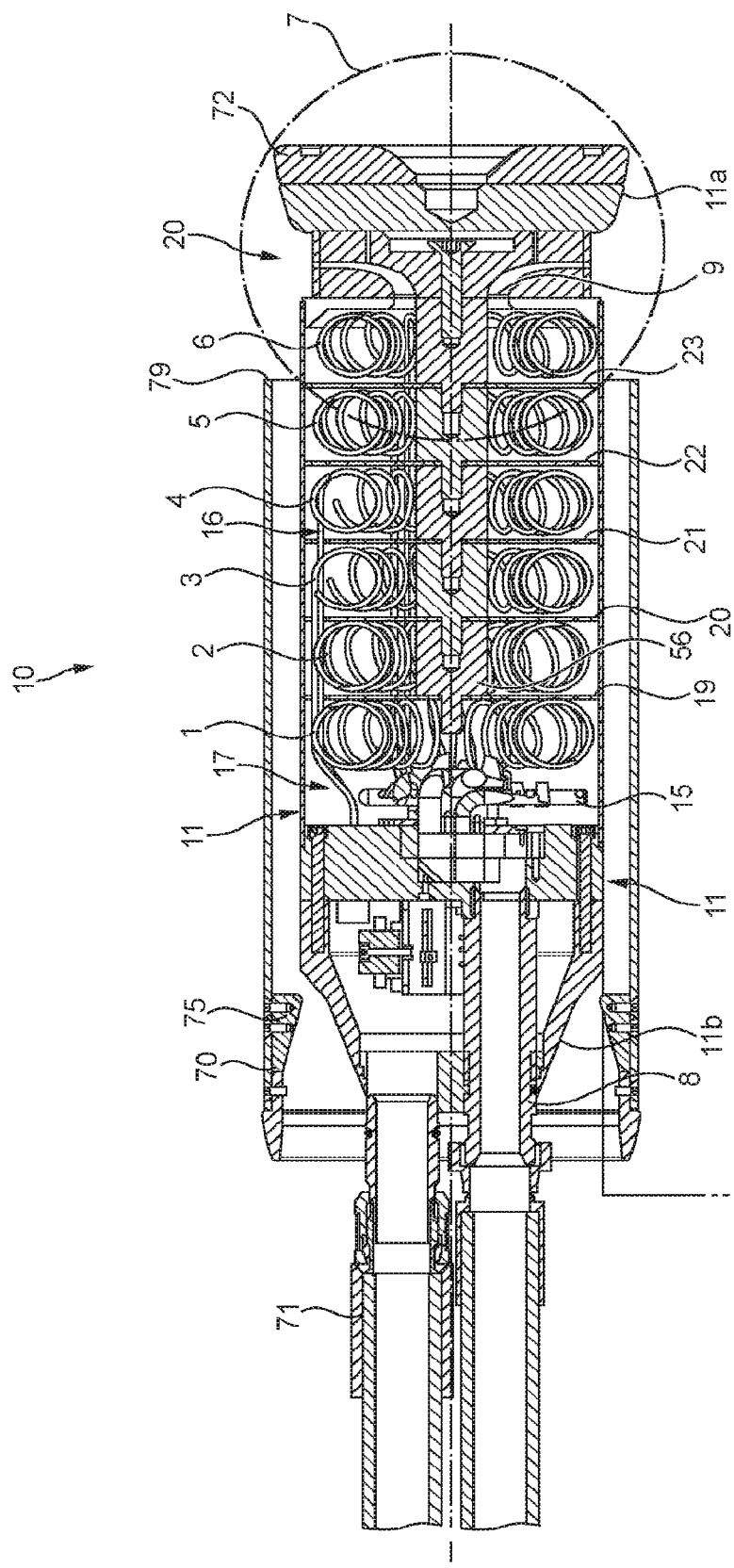
FIG. 1 shows an embodiment of a pig with an outlet diffuser in accordance with the invention.

FIG. 1 shows a pig 10 for fitting a liner to the inside of a pipe. The pig 10 is for use in a method of lining a water or sewage pipe as described in any of WO98/26919, WO2004/090411 or WO2004/090411. In particular, the pig 10 is designed to heat a liner sleeve of thermoplastic material and any reinforcing elements. The pig 10 can be used to heat a liner sleeve to form a rigid liner in any duct, for instance an electrical duct or a gas pipe as well as a water or sewage pipe.

The pig 10 has a pig body 11 defining a longitudinal axis 7 that extends in a longitudinal direction from a rear portion 11a to a front portion 11b. The pig body 11 is generally elongate in the longitudinal direction.

The pig 10 comprises an outlet diffuser 20 forming part of the rear portion 11a and a heating chamber 17 (which is preferably cylindrical) within which is housed a heater 16.

The pig 10 preferably comprises a forming tool 72 at the rear end of the rear portion 11a for forcing the heated liner sleeve radially outwardly into the surface of a pipe or duct. The forming tool 72 has a generally cylindrical radially outer surface with a larger diameter than the pig body 11.

Figure 4:
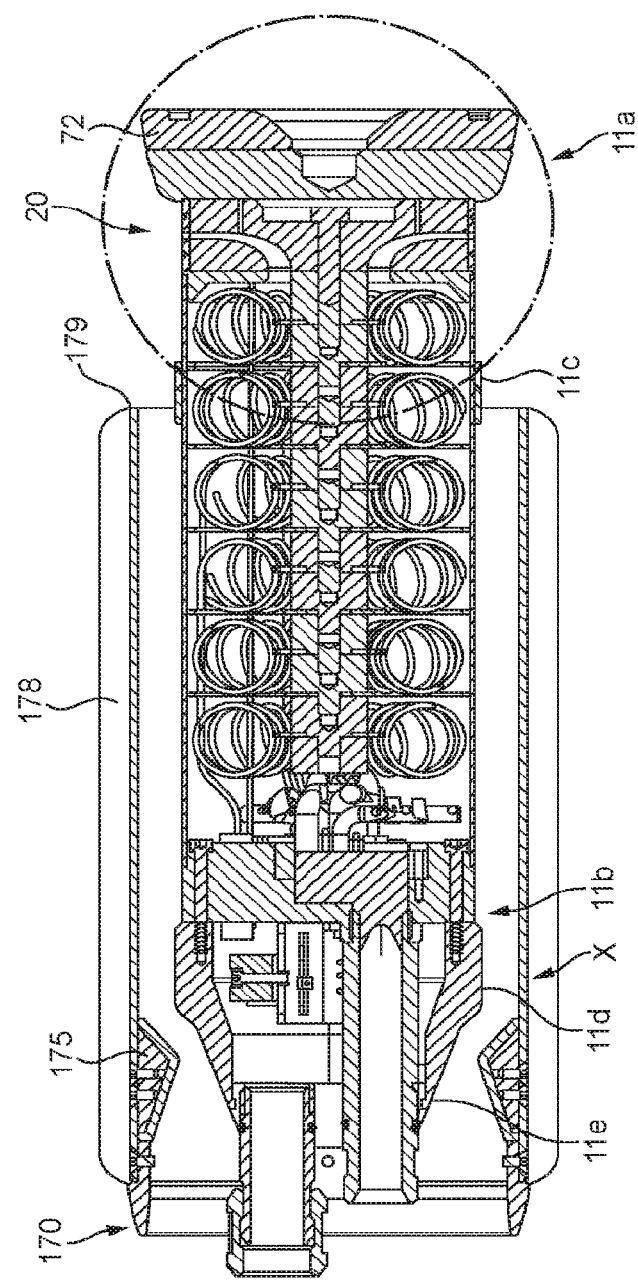
FIG. 4 shows an alternative embodiment of a pig in accordance with the invention.

Preferably, a shroud 70 around the pig main body 11. The shroud is tubular and generally cylindrical. As shown in FIG. 4, in some embodiments, the shroud 70 may comprise longitudinally extending members 178 spaced around its outer circumference. The longitudinally extending members 178 are resilient and so are arranged to centre the shroud 70, 170 within a pipe.

In this way, the longitudinally extending members 178 can axially align the pig main body 11 within the pipe.

Moreover, the longitudinally extending members 178 are spaced apart and so form a flow path between the shroud 70 and the pipe through which fluid (for example, exhaust heating gas) can escape through the pipe ahead of the pig 10.

The front portion 11b of the pig is preferably formed with a tapered nose 11e. The tapered nose 11e has an outer diameter 11d. The shroud preferably has either a plurality of spacers 75, 175 spaced around its inner perimeter or a singular annular spacer 175. The inner diameter of the spacer(s) 75, 175 is/are less than the outer diameter 11d of the nose 11e.

As can be seen from FIG. 4, the spacer(s) 175 preferably have a tapered surface that is shaped so as to be substantially complementary to the outer surface of the nose 11e.

In use, the liner sleeve may pass between the shroud 70 and the pig main body 11. The liner has a thickness X. As the pig main body 11 passes through the liner, the liner pushes the shroud 70 forward and the shroud 70 centres the pig body 11 via force transmitted through the liner.

The contact between the nose 11e, the liner, and the shroud 70 can create a seal that prevents heated gas ejected from the diffuser 20 from passing forward within the sleeve ahead of the pig main body 11.

The shroud 70, 170 has an axial length such that its rear end 79, 179 does not overlap with the outlets 9 of the diffuser 20. Preferably, the shroud rear end 79, 179 is axially spaced from the outlets 9 of the diffuser 20.

Optionally, there may be provided a cable duct for housing power cables to power the heater 16 and/or thermocouple signal lines.

The heater 16 is preferably formed from a plurality of annular coiled heating elements 1 to 6 all arranged around the common longitudinal axis 7. The pig 10 has a gas supply port 8 for supplying gas to the heating chamber 17, and heated gas leaves the pig 10 in a radial direction via a series of apertures 9 in an outlet diffuser 20 at the rear end 11a of the pig 10. Thus, the heating chamber 17 forms a flow channel in the pig body 11 from a gas supply port 8 to the outlet diffuser 20.

Optionally, the gas supply port 8 is radially offset from the axis 7.

Gas delivered by the gas supply port 8 may be directed through a tree diffuser 15 to deliver gas to the heating chamber 17. The tree diffuser 15 comprises branch pipes extending radially out from a central trunk portion that is in communication with inlet tube 8. Preferably, at least a portion of the branch pipes extend in a plane perpendicular to the longitudinal axis 7.

Gas flow through the heating chamber 17 and thereby the heating efficiency of the pig 10 may be assisted by the use of baffles 19 to 23 and a central core 56 on which the baffles 19 to 23 are mounted and which extends through apertures in the baffles 19 to 23 and through the central apertures of the coiled heating elements 2 to 6. The central core 56 ensures that the gas flow through the heating chamber 17 passes across the coiled heating elements 2 to 6, rather than passing through their aligned central apertures.

Preferable forms of the baffles 19 to 23 are shown, respectively, in FIGS. 3a to 3j, as described below.

Figure 2A:
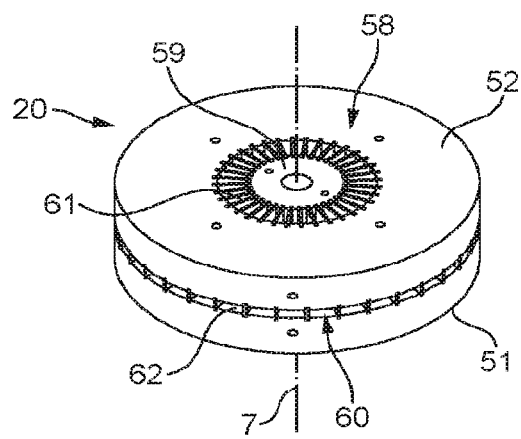
FIG. 2a shows the outlet diffuser of the pig shown in FIG. 1.
Figure 2B:
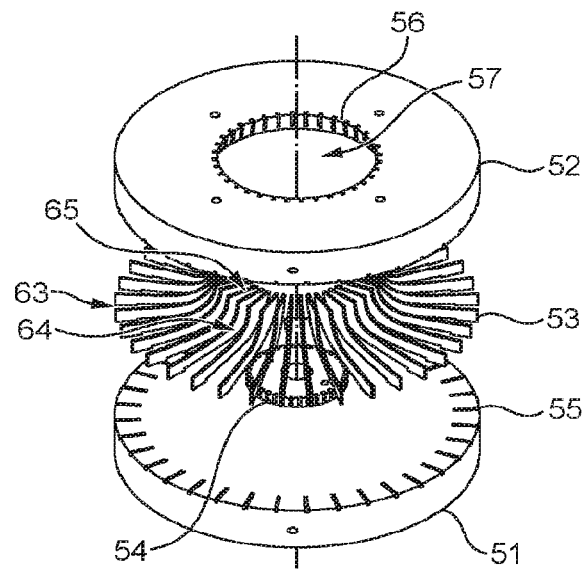
FIG. 2b shows the outlet diffuser of FIG. 2a in an exploded view.
Figure 2C:
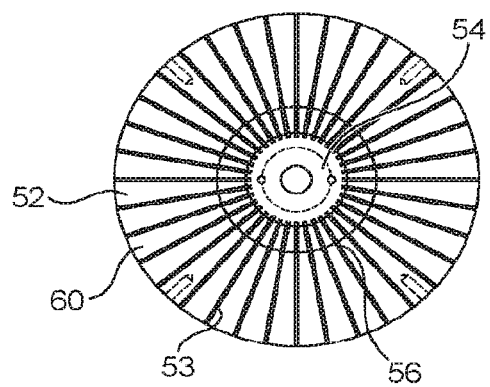

An outlet diffuser 20 in accordance with the invention is shown in more detail in FIGS. 2a to 2c.

The outlet diffuser 20 has a generally cylindrical radially outer surface, preferably either with a smaller diameter (see FIG. 1) or the same diameter (see FIG. 4) than the pig body 11 for providing a space, between the liner sleeve and the outlet diffuser 20, into which heated gas may flow.

The diameter of the pig body 11 is of course related to that of the pipe in which it is to be used. However, the outer diameter of the pig body 11 may be 50 mm to 60 mm less than inner diameter of the cylindrical part of the shroud 70.

The diameter of the forming tool 72 is preferably 20 mm to 30 mm less than the inner diameter of the pipe in which it is to be used.

The outlet diffuser 20 preferably comprises a first member 51 and a second member 52.

The first member 51 has a generally cylindrical main section 55 with a first radius and a protruding section 54 that extends centrally from the main section 55 along the longitudinal axis 7.

The protruding section 54 has a second radius, which is smaller than the first radius.

Preferably, the protruding section 54 is defined by a surface that curves gently away from the cylindrical main section 55.

The second member 52 is generally annular and comprises an opening 57. Preferably, the side of the second member 52 facing the first member 51 has a generally matching contour extending from the radially outer edge to the rim of the opening 57.

The protruding section 54 extends into the opening 57 so as to define an annular space therebetween. The second member 52 is also axially spaced from the main section 55 of the first member 51. In this way, the first and second members 51 and 52 define an annular space therebetween from an opening to the heating chamber 17 in the longitudinal direction facing forwardly with respect to the pig 10 to an opening to the exterior of the pig 10 in the radially outward direction with respect to the longitudinal axis 7.

So as to improve the distribution of heated gas directed out of the pig 10 through the outlet diffuser 20, and also advantageously to suppress rotational flow of heated gas around the longitudinal axis of the pig 10, it has been found preferable to divide the annular space into discrete channels. Accordingly, within the annular space there is provided a plurality of vanes 53.

Thus, the outlet diffuser 20 comprises a plurality of channels 60. Each channel 60 comprising an inlet 61 facing the front portion 11b of the pig 10 in the longitudinal direction and an outlet 62 facing radially outwardly from the pig 10 perpendicular to the longitudinal axis 7.

Each channel 60 preferably includes a curved portion 64 joining two straight portions 63 and 65. The two straight portions 63 and 65 of each channel 60 include a straight inlet portion 65 and a straight outlet portion 63. Preferably, the inlet portion 65 is shorter than the outlet portion 63.

As can be most easily seen with reference to the shape of the vanes 53 in the exploded view of FIG. 2b, gas flowing through each channel 60 of the outlet diffuser 20 will enter through the inlet 61, then pass through the straight inlet portion 65 to the curved portion 64 from which it will flow to the straight outlet portion 63 and then on through the outlet 62.

As can be most easily seen from the schematic layout of FIG. 2c, the vanes 53 extend, in a plane perpendicular to the longitudinal axis 7, along radii extending outwardly from the longitudinal axis 7. Thus, the distance between the vanes at the outlets 62 is greater than at the inlets 61 (because these are radially inwardly thereof). As such, the radial dimension of the inlet is greater than the axial dimension of the outlet. Preferably, the cross-sectional area of each channel is either constant, or monotonically increases, along its length. Preferably, the inlets 61 are equally spaced radially around the longitudinal axis. Preferably, the outlets 62 are equally spaced radially around the radially outer circumference of the outlet diffuser 20.

It is preferred for a smooth flow path from the heating chamber 17 to the diffuser 20 that the radially innermost edge of the inlets 61 is aligned with the outer edge of the central core 56.

The inventors have also learned that a pig with or without the tree diffuser 15 or outlet diffuser 20 described above, or indeed in combination with any of the embodiments described above, preferably has baffles separating a plurality of heating coils 1 to 6 within a heating chamber 17 having a central core 56 on which the baffles 19 to 23 are mounted and which extends through apertures in the baffles 19 to 23 and through the central apertures of the coiled heating elements 1 to 6, wherein the baffles are formed as shown in FIGS. 3a to 3j.

Figure 3A:
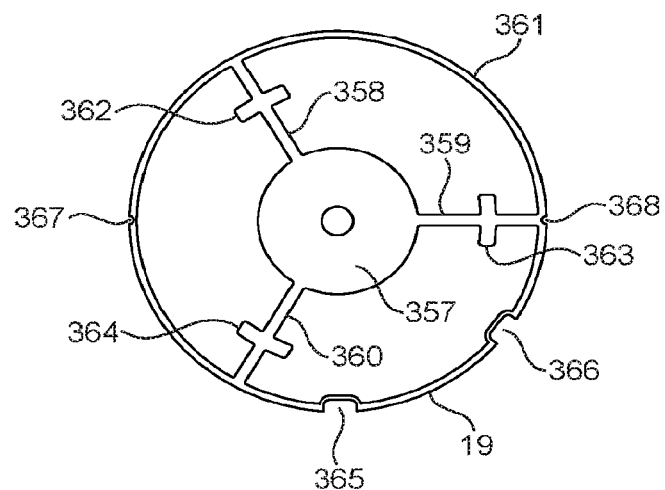
FIGS. 3a to 3j show baffles for use in a pig.

The baffles 19 to 23 are showing respectively in FIGS. 3a to 3j, all viewed face on from the inlet side of the heating chamber 17. Each baffle has a central circular land and three arms extending radially out from the central circular land to a circular rim. For instance, the baffle 19 has a central circular land 57 and three arms 58, 59 and 60 which connect the central land 57 to a circular exterior rim 61. Each arm 58, 59 and 60 is cruciform in shape, with a cross bar extending outwardly on both sides at a position approximately two thirds along the length of the arm, beginning at the land. In FIG. 3a the arm 58 has a cross bar 62, the arm 59 has a cross bar 63 and the arm 60 has a cross bar 64.

Also in FIG. 3 it can also be seen that the rim 61 is provided with notches 65, 66, 67 and 68 which are designed to engage with the stems of the heating coils 1 to 6 (and also can allow passage of sensor wiring). The heating coils 1 to 6 may be held in place by the stems engaging in the baffle notches 65, 66, 67 and the baffles being locked on the central shaft.

Figure 3B:
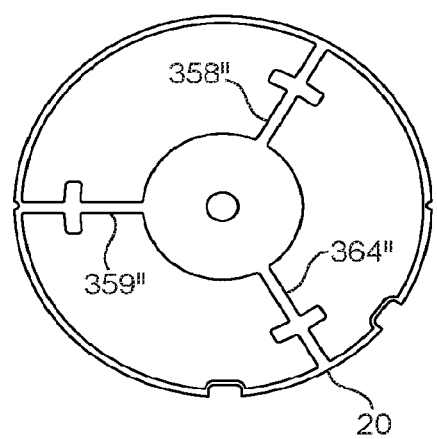
Figure 3C:
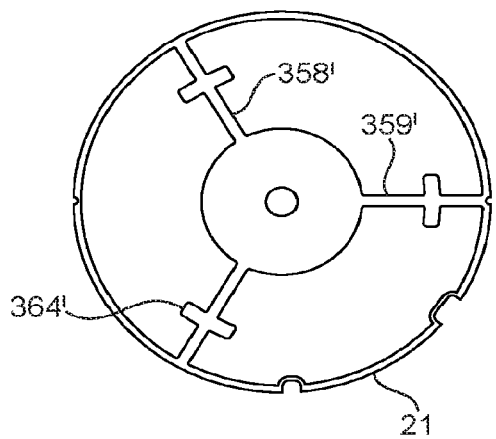
Figure 3D:
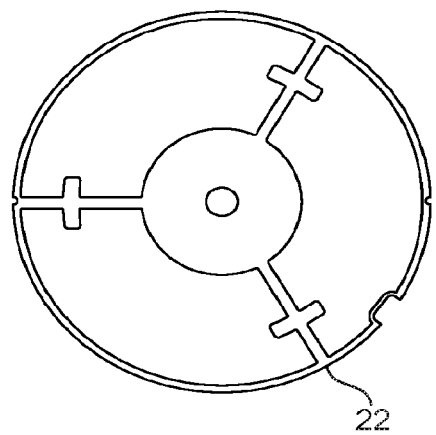
Figure 3E:
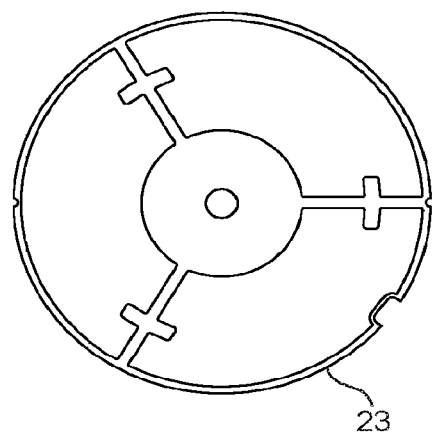
Figure 3F:
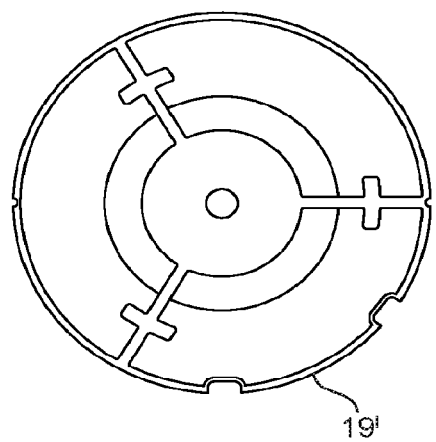
Figure 3G:
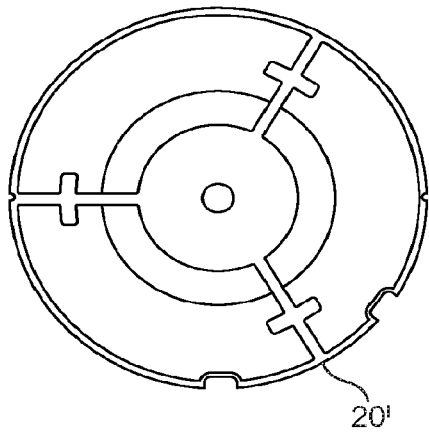
Figure 3H:
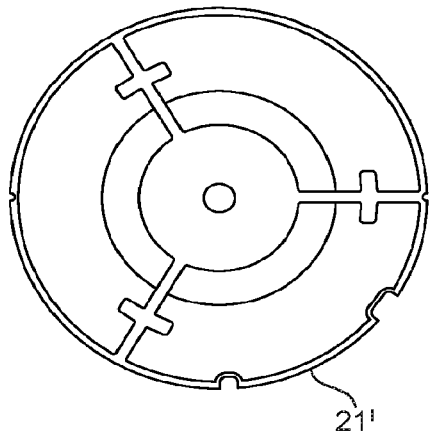
Figure 3I:
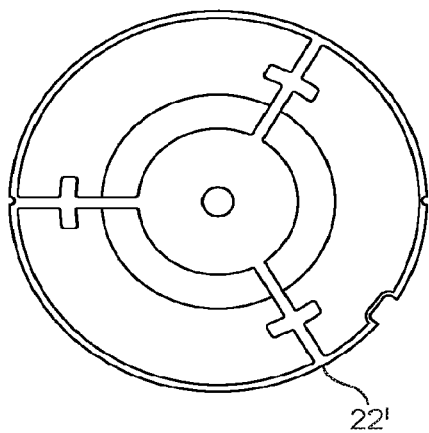
Figure 3J:
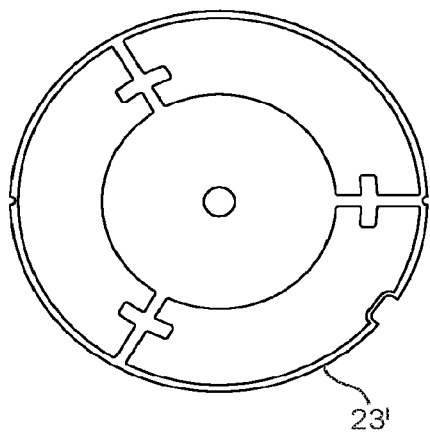

The baffles 20, 21, 22 and 23 have features identical to the baffle 19, but the orientation of the arms of each baffle when secured in place within the cylindrical heating chamber 17 is different to the orientation of the arms of neighbouring baffles. For instance, looking at FIGS. 3a, 3b, and 3c it can be seen that the baffles 19 and 21 of FIGS. 3a and 3c have arms 58 and 58' approximately at the 11 o'clock position, while the arm 58" of the baffle 20 in FIG. 3b is approximately at the 1 o'clock position. In a similar way the arms 59 and 59' of the baffles 19 and 21 are at the 3 o'clock position, whilst the arm 59" of the baffle 20 is at the 9 o'clock position. Furthermore the baffle arms 64 and 64' of the baffles 19 and 21 are at the 7 o'clock position, whilst the arm 64" of the baffle 20 is at the 5 o'clock position.

The configuration of the baffles and their orientation with respect to each other are selected so that the flow of gas along the cylindrical chamber 17 is directed by the baffles across the coils of the coiled heating elements 1 to 6.

Whereas in FIGS. 3a to 3e the baffles 19 to 23 are all shown with a central land of a first diameter 57 of 53 mm, alternative baffles 19', 20', 21', 22' and 23' are shown in FIGS. 3f to 3j, with the baffles 19', 20', 21', 22' having a larger central land of a second diameter of 57 mm and the baffle 23' having a much larger central land of a third diameter of 75 mm. This arrangement of baffles 19', 20', 21', 22' and 23' could be used in place of the baffles 19 to 23 in certain situations in order to achieve a different arrangement of gas flow through the cylindrical heating chamber 17. The baffle 23' with the much larger central land could also be used with the baffles 19 to 22, in place of the baffle 23.

The invention claimed is:

1. A pig for fitting a liner to the inside of a pipe, comprising:
    a pig body defining a longitudinal axis in a longitudinal direction from a front portion to a rear portion;
    a gas supply port in the front portion;
    a gas outlet diffuser forming part of the rear portion;
    a heating chamber in the pig body forming a flow path from a fluid inlet to the outlet diffuser; and
    a heater within the heating chamber,
    wherein the outlet diffuser comprises a plurality of channels defined by a plurality of vanes extending between a first member of the outlet diffuser and a second member of the outlet diffuser, each channel comprising an inlet facing the front portion in the longitudinal direction and an outlet extending radially outwardly from the longitudinal axis.

2. The pig of claim 1, wherein each channel includes a straight outlet portion between a curved portion and the outlet.

3. The pig of claim 2, wherein:
    each channel includes a straight inlet portion between the curved portion and the inlet; and
    the inlet portion is shorter than the outlet portion.

4. The pig of claim 1, wherein the cross-sectional area of each channel is constant or monotonically increases along its length.

5. The pig of claim 1, wherein the inlets of the channels are spaced radially from and circumferentially around the longitudinal axis.

6. The pig of claim 5, further comprising a central core extending along the longitudinal axis to the outlet diffuser, wherein a radially innermost edge of the inlets of the channels is aligned with an outer edge of the core.

7. The pig of claim 1, wherein the outlets are spaced around an outer circumference of the outlet diffuser.

8. The pig of claim 1, wherein the pig body has a greater diameter than the outlet diffuser.

9. The pig of claim 1, wherein the outlet diffuser has a generally cylindrical radially outer surface.

10. The pig of claim 1, wherein:
    the first member has a generally cylindrical main section with a first radius and a protruding section that extends centrally from the main section along the longitudinal axis, the protruding section having a second radius, the second radius being smaller than the first radius; and
    the second member is generally annular and surrounds the protruding section so as to define a space therebetween in which the vanes are located.

11. The pig of claim 1, further comprising a shroud, surrounding the pig body.

12. The pig of claim 11, wherein the shroud comprises a plurality of members on its outer surface for contacting the inner surface of a pipe.

13. The pig of claim 12, wherein the members are elongate and extend longitudinally for defining a flow path therebetween.

14. The pig of claim 11, wherein the pig main body has a tapered nose portion and the shroud has one or more spacers on its inner surface, the spacer(s) having a complementary shape to the tapered surface of the nose.

\* \* \* \* \*